United States Patent [19]

Hubbard et al.

[11] Patent Number: 4,573,060

[45] Date of Patent: Feb. 25, 1986

[54] INSTRUMENT MARKER PEN AND PEN ARM ASSEMBLY

[75] Inventors: James R. Hubbard, Moorestown; Ronald B. Berry, Stratford, both of N.J.

[73] Assignee: Graphic Controls Corporation, Buffalo, N.Y.

[21] Appl. No.: 537,332

[22] Filed: Sep. 29, 1983

[51] Int. Cl.⁴ .............................................. G01D 15/16
[52] U.S. Cl. ............................ 346/140 A; 346/139 C
[58] Field of Search ............ 346/140 A, 140 R, 139 C

[56] References Cited

U.S. PATENT DOCUMENTS

| | | | |
|---|---|---|---|
| 2,199,078 | 4/1940 | Lindemann | 346/140 A |
| 3,264,652 | 8/1966 | Squier | 346/140 A |
| 3,893,130 | 7/1975 | Browning et al. | 346/140 A |
| 4,129,876 | 12/1978 | Hubbard | 346/140 A |
| 4,320,405 | 3/1982 | Freude | 346/140 A |
| 4,337,471 | 6/1982 | Hubbard et al. | 346/140 R |
| 4,464,671 | 8/1984 | Lytle | 346/140 A |

OTHER PUBLICATIONS

Series 51 Disposable Pens Advertisement, Graphic Controls Corp.

Primary Examiner—E. A. Goldberg
Assistant Examiner—Gerald E. Preston
Attorney, Agent, or Firm—Ratner & Prestia

[57] ABSTRACT

Disposable pen and pen arm for a recording instrument, the pen stylus and pen arm being correspondingly elongated and bent to mate with one another in their assembled configuration. The pen body having a slot for receiving the pen arm upon installation and piloting the pen body rearwardly to an installed location, which is otherwise not conveniently accessible.

6 Claims, 6 Drawing Figures

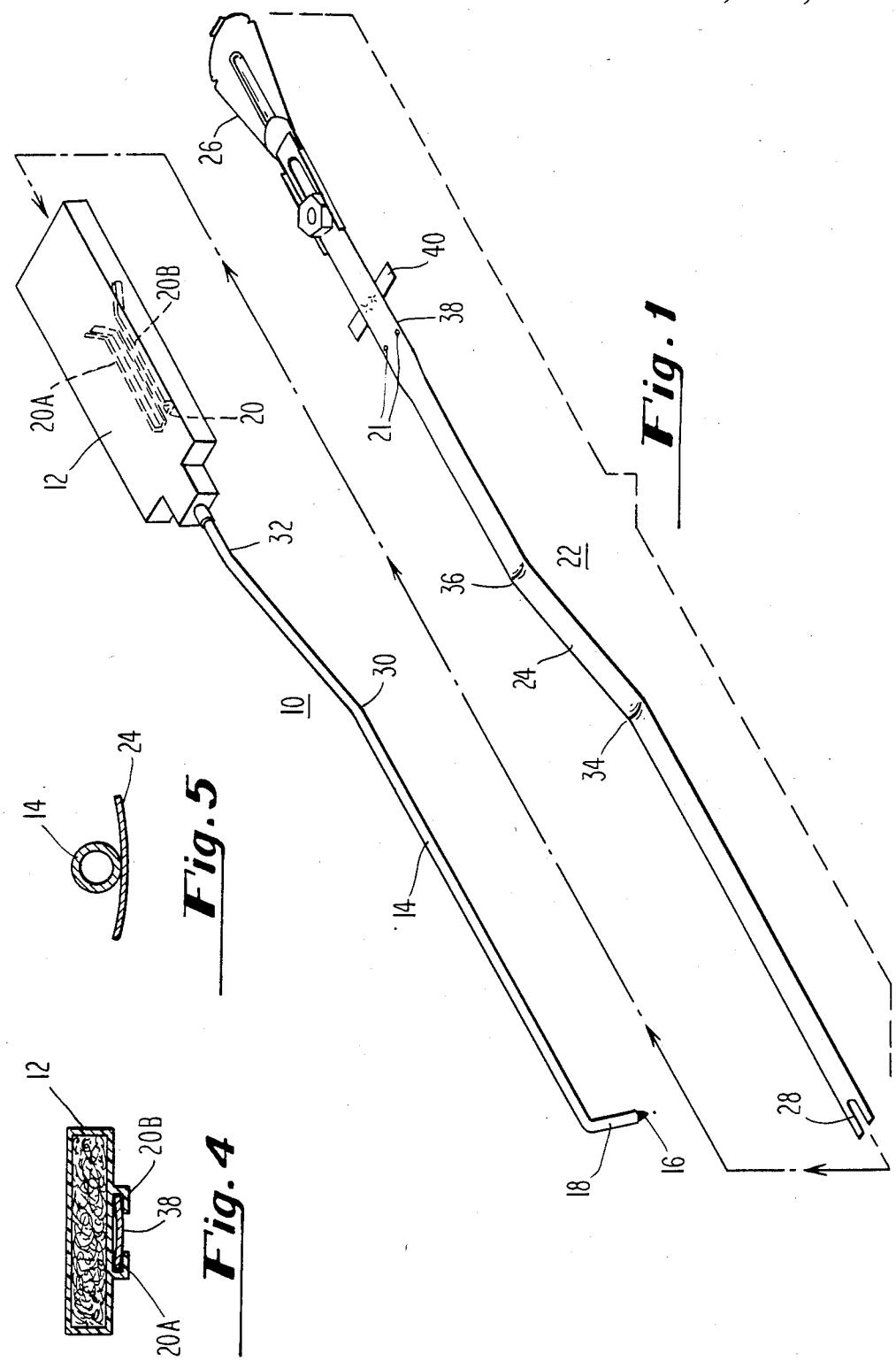

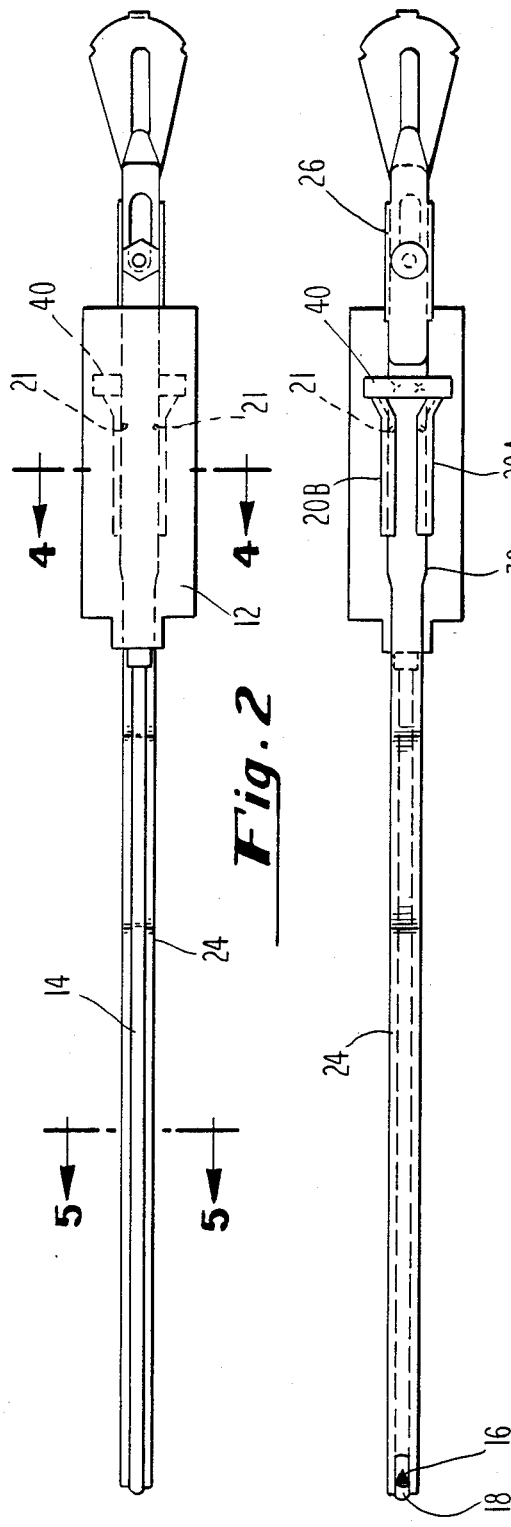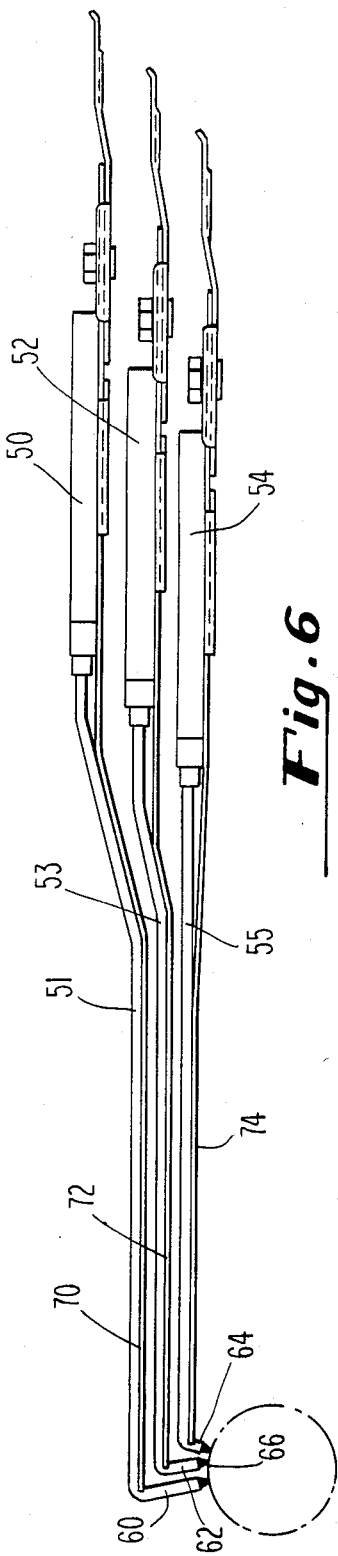

INSTRUMENT MARKER PEN AND PEN ARM ASSEMBLY

BACKGROUND OF THE INVENTION

This invention pertains to an instrument pen and pen arm, and the combination thereof, all adapted for the convenient installation of a disposable marker in an instrument in which the marker body is located at some distance from the marker writing tip. In particular, this invention pertains to a disposable marker and mounting arm wherein the marker body, when mounted in an instrument, is not readily accessible and from which an extended length stylus tube projects to a writing location at an exposed face of the instrument.

Instruments for the recordation of variables such as temperature and the like utilize a variety of pen designs for actually tracing a line recording on a writing surface. Within the past fifteen years, pens of this type have been significantly improved with respect to reliability, ease of installation, and cost, primarily through the provision of disposable markers of various types, many of which are specifically configured for use in instruments of particular design.

As these instruments have become smaller and smaller, it has become increasingly difficult to provide pens having the attributes of reliability and ease of installation, even apart from cost. This difficulty is enhanced in pen designs developed for installations in which a plurality of pens may be used in conjunction with one another, i.e., the pens must necessarily pass over one another for tracing lines on a common writing surface. This is particularly true for pens used in those instruments in which the location of the writing surface is at an accessible face for easy reading, while the pen mounting means and the space provided for the pen reservoir body or ink supply is disposed at some distance from the writing surface, generally deep within the instrument and at a location relatively inaccessible for pen installation.

One type of disposable marker heretofore provided for that purpose comprises a relatively flat body (in which the ink reservoir is housed), adapted to pass over other like pens in a horizontal plane. Each such pen includes an elongated stylus tube extending forwardly from the body to the writing surface. In a marker of this type, the body also includes a slot for receiving a pen arm mounted to the bottom surface of the marker body; the pen arm extends forwardly in the slot of the marker body to a positioning stop at the forward end thereof. Conventionally, these pen arms have been relatively short and the markers have been relatively difficult to install. Installation is generally accomplished either by opening the instrument to permit accessibility to the rearward portion in which the pen body is mounted on the pen arm, or by careful manipulation of the pen rearwardly, using the stylus tube as the support means for the marker body as it is passed through the stylus tube opening and eventually piloted onto the pen arm for mating engagement with the slot provided on the marker body.

Other than the markers and pen arms described above, instrument marking systems with elongated pen arms are seen also for example in patents such as the following:

U.S. Pat. Nos. 2,176,777; 2,752,220; 2,800,385; 2,820,689; 3,163,491; 3,264,652; 3,311,920; 3,452,359.

However, it will be noticed that in each of these patents, either an extended arm is provided for the mounting at the forward end thereof of a relatively short length marker or marker element or an extended pen arm is utilized as the mounting for a flexible tube. Note U.S. Pat. No. 3,264,652, for example, in which the flexible tube is fastened to the elongated pen arm by adhesive strips 33, 34, and 35.

From the foregoing, it is apparent that there is a need for an improved design pen, pen arm, and combination thereof for use in those instrument marking systems wherein the ink reservoir body is to be located in a relatively inaccessible location and the writing tip associated therewith is connected by an elongated stylus tube, and wherein the pen and pen arm are adapted so that several of such pens may be used together and may pass over one another for writing on a common writing surface.

It is, therefore, the general object of the present invention to provide such a pen and pen arm and a combination of such a pen and pen arm adapted to mate with one another.

BRIEF DESCRIPTION OF THE INVENTION

Briefly, the present invention comprises an instrument marking pen with an ink reservoir body having a stylus tube extending in the lengthwise direction from the body to a writing nib at the far end thereof, the length of the tube between the body and the nib exceeding the length of the body. This marker further includes a lengthwise slot on the body adapted to slidingly receive a pen arm extending along the entire length of the body.

The present invention also comprises a pen arm with an elongated blade having means at one end of the blade for mounting the arm in an instrument and means at the other end of the blade for positioning the nib of a pen mounted thereon.

This invention further comprises a combination of a marker and pen arm as described above.

Preferably, the pen arm of the present invention includes a rearward positioning means, for limiting rearward movement of the marker body thereon. Preferably also, the cross section of the pen arm, on the foreward part thereof, is adapted to permit easy sliding engagement of the arm in the marker body slot on the forward part of the pen arm so that the marker may be mounted at the forward accessible face of an instrument and slid along the pen arm to the rearward portion thereof; the pen arm there including a slightly enlarged width to cause frictional engagment of the pen arm in the lengthwise slot of the marker body when the body is in the fully installed position and, preferably, dimples to better secure that engagement. Preferably also, the pen arm is comprised of a resilient material, such as stainless spring steel, and includes bends corresponding to those of the extended length stylus tube, so as to minimize the horizontal space required for the pen arm-tube combination, thus facilitating a plurality of pen arm-tube combinations to pass over one another. The bent configuration of the pen arm may also provide means for controlling the writing pressure at the nib end of the stylus tube.

For a better understanding of the present invention, reference may be made to the detailed description thereof which follows, taken in conjunction with the appended claims and the accompanying drawings.

BRIEF DESCRIPTION OF THE DRAWINGS

In the drawings, FIG. 1 is a perspective view of a marker and pen arm in accordance with the present invention;

FIGS. 2 and 3 are plan and bottom views respectively of one such marker and pen arm in their assembled or combination configuration;

FIG. 6 is a side view showing a plurality of such marker-pen arm combinations, as installed in an instrument, adapted for ready passage over one another and for writing on a common writing surface; and FIGS. 4 and 5 are detailed cross-sectional views of the marker and pen arm shown in FIG. 2, in the planes 4—4 and 5—5 respectively.

DETAILED DESCRIPTION OF THE INVENTION

Referring first to FIG. 1, there is shown a line recording instrument marker pen 10 comprising an ink reservoir body 12 (generally flat to permit ready passage of a plurality of pens over one another), having an elongated stylus tube 14 extending in the lengthwise direction from body 12 and terminating with a writing nib 16 at a bent front portion 18 of stylus tube 14. The underside of body 12 includes (as shown in phantom in FIG. 1) a lengthwise slot 20 provided by channel members 20A and 20B, adapted to slidingly receive a pen arm along the length of the underside of body 12, body 12 further including no other interfering configurations to preclude the sliding engagement of a mating pen arm along the whole length of body 12.

Also seen in FIG. 1 is pen arm 22 comprising, in accordance with the present invention, an elongated blade 24 with mounting means 26 at the rear end of blade 24 for mounting pen arm 22 in an instrument and a positioning means, namely a slot 28, at the forward end of blade 24 for positioning the forward end of blade 24 at the nib end of the mating stylus tube.

Intermediate the ends of stylus tube 14, in the plane formed by bent portion 18 and stylus tube 14, bends 30 and 32 are provided to facilitate inter-pen passage of a plurality of such pens used in combination. Blade 24 includes corresponding bends 34 and 36, so that when marker 10 and arm 22 are assembled as shown by the arrow in FIG. 1, the stylus tube 14 of marker 10 traverses essentially the same lengthwise path as blade 24 of pen arm 22. In this manner, the vertical space required by the stylus tube - pen arm combination is minimized.

Preferably, blade 24 is comprised of a resilient material, such as stainless spring steel. This permits control of writing pressure by preloading the harp-shaped spring end of arm 22. Arm 22 then exerts pressure through channel members 20A and 20B to the marker 10 and thus to the writing tip. The resilient material used in the pen arm also provides the reaction force necessary to cause blade 24 to hug stylus tube 14.

Near the rear end of blade 24, an expanded width portion 38 is provided to frictionally engage the sidewalls of channel elements 20A and 20B so as to secure the mating engagement of marker 12 and arm 22. Preferably, dimples 21 (downwardly pinched point-projectons) are provided to enhance the frictional engagement of expanded width portion 38 in slot 20. Further, a widthwise stop member 40, to the rear of expanded width portion 38, is provided so as to provide a positive positioning stop for body 12 as it is slid onto pen arm 22.

Still further, channel elements 20A and 20B of body 12 are flaired outwardly at the rear ends thereof, to better engage stop member 40 and thus to facilitate the positioning function of cross member 40. The outward flair of channel elements 20A and 20B also function to pilot or guide marker 10 as it is assembled onto arm 22.

FIGS. 2 and 3 illustrate markers similar to that shown in perspective in FIG. 1. Common elements are indicated by common reference numbers.

FIG. 6 shows an assembly of a plurality of marker - pen arm combinations in accordance with the present invention. In particular, marker bodies 50, 52, and 54 are each associated with stylus tubes 51, 53, and 55, all terminating in bent portions 60, 62, and 64, respectively, from each of which projects a nib writing on a common writing surface 66. By virtue of the generally flat configuration of marker bodies 50, 52, and 54, the configuration of stylus tubes 51, 53, and 55, together with associated elongated pen arms 70, 72, and 74, and the corresponding bends therein, there is provided a space efficient, three pen combination, the pens of which are adapted to write on a common surface and to pass over one another. The somewhat larger proportion of space occupied by those parts of the writing elements in which are located marker bodies 50, 52, and 54 is generally provided, in instruments of the type to which the present invention is directed, rearward of a forward accessible writing surface 66 and at a position where it is relatively difficult to install a marker pen.

Thus, it is significant that, in accordance with the present invention, markers and pen arms of the foregoing type are provided, which are more readily assembled, installed, and serviced than those heretofore available.

As seen in FIG. 5, to further minimize the possibility of inter-pen interference, pen arm blade 24 may be curved slightly toward a mating stylus tube 14, so as to minimize the vertical space required by the pen arm - stylus tube combination. The same curvature of blade 24 is seen in FIG. 4 to provide somewhat better sliding engagement of the forward part of blade 24 in the slot provided by channel members 20A and 20B and also to provide somewhat better frictional engagement at the rear of pen arm 22, when channel elements 20A and 20B engage the expanded width portion 38 of blade 24.

In general, the marker of the present invention differs from that heretofore used in instruments of the type to which the present invention is directed, by the provision of a lengthwise slot member for receiving an elongated pen arm without interference or stop means along the surface on which the pen body slot is located. This permits the pen arm to slide substantially along the entire length of the pen body. Further, the present invention generally is directed to those type instruments in which a stylus tube is provided which is at least the length of the marker body, so as to render it difficult to mount the marker body in a rearward inaccessible position on a slidably engaged pen arm.

At the rear end of the pen arm, the pen arm in accordance with the present invention mounts in the recorder in the same fashion as a conventional pen arm in instruments of this type. The position of the marker tip is adjusted when the arm is installed by sliding the support arm relative to the support arm holder and tightening a nylon nut at the end of the pen arm.

For installation of a marker on a pen arm, using the present invention, the user simply places the marker body on top of the forwardly extended end of the elongated pen arm and pushes the marker onto the pen arm, so that the arm slidingly engages the slot provided for that purpose. The pen is then pushed further into the recorder housing until it stops by abutment against the stop member at the rear of the arm or by frictional engagement on the widthwise expanded portion of the pen arm.

The extension of the mounting arm to the front of the recorder by the provision of an elongated pen arm in accordance with the present invention facilitates this sliding mounting engagement of marker and arm. This mounting is further facilitated by the provision of the tapered entrance to the slot on the marker body, so as to pilot the forward end of the pen arm into the marker body slot, even if the forward part of the pen arm itself is not readily accessible or visible.

Generally, the pen arm is comprised of spring tempered stainless steel in a thickness range from 0.004 to 0.008 inches to provide a combination of good rigidity coupled with sufficient flexibility to allow the bends, particularly the "Z" bends of the arm, to flex while passing through the marker slot, while not requiring excessive insertion or removal force on the pen body.

As previously noted, the stop on the arm which locates the marker abuts the back end surface of the marker body channel members. This surface on the marker body channel members is located precisely relative to the writing tip thus assuring accurate tip positioning. The stop member on the pen arm may be welded as a cross member onto the pen arm or may be formed in the pen arm initially.

In a further embodiment, a frictionally fit arrow may be placed (spot welded, spring clip mounted, etc.) at the end of the pen arm to eliminate the need for mounting of a similar plastic arrow on the marker tube.

Instead of the spring tempered stainless steel blade, the pen arm may comprise lighter metals, such as aluminum, magnesium, etc., in order to minimize the mass of the pen arm and thus to enhance recorder response.

To further position and retain the marker body at the proper location on the pen arm, a slight additional bend can be provided on the pen arm just at the forward edge of the case of the body marker in its mounted position, so as to better retain the body rearwardly on the pen arm in the fully mounted position.

While this invention has been described with respect to specific embodiments thereof, it is not limited thereto. Rather, the appended claims are intended to include, in addition to the forms of the invention specifically disclosed, such other forms, embodiments, and variants of the invention as may be devised by those skilled in the art without departing from the true spirit and scope thereof.

We claim:

1. Line recording instrument marker pen comprising
   (a) an ink reservoir body having a length and a width,
   (b) an elongated stylus tube extending in the lengthwise direction from said body and terminating in a writing nib at the end thereof,
   (c) a lengthwise slot on said body adapted to slidingly receive a mating elongated pen arm along the entire length of said body and along substantially the entire length of said pen arm,
   (d) a slidingly engageable retainer means adapted for retention of said body on said mating pen arm in the fully assembled position of said pen on said mating pen arm, wherein said stylus tube is coextensive with said pen arm.

2. Line recording instrument marking pen, as recited in claim 1, wherein said pen is adapted to be assembled with a pen arm having a first elongated section adapted to be slidably received within said pen body slot and a second retention section at the end of said first section adapted to be frictionally engaged within said pen body slot.

3. Line recording instrument marker pen, as recited in claim 2, wherein said elongated stylus includes at least one bend, intermediate said pen body and said nib end and is adapted to be engaged and slidingly received on a pen arm also having at least one bend said bends corresponding in position and direction when said pen and pen arm are in their fully assembled position.

4. Line recording instrument marker pen, as recited in claim 2, wherein said pen body slot includes an end portion on the end thereof distal from said stylus tube comprising an abutment for matingly receiving a pen arm positioning crosspiece.

5. Line recording instrument marker pen, as recited in claim 4, wherein said end portion of said slot has two side walls adapted to stop movement of said pen arm through said slot upon abutment of said crosspiece with said sidewalls.

6. Line recording instrument marker pen, as recited in claim 4, wherein said crosspiece is disposed perpendicularly of the length of said slot and co-planarly with said frictionally retained second retention section of said pen arm.

* * * * *